United States Patent
Lehning et al.

(10) Patent No.: US 7,204,384 B2
(45) Date of Patent: Apr. 17, 2007

(54) DUAL COVER SYSTEM WITH CLAMPING CLOSURE MECHANISM

(75) Inventors: Helmut Lehning, Barenburg (DE); Michael Monz, Bottrop (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 70 days.

(21) Appl. No.: 10/675,532
(22) Filed: Sep. 30, 2003

(65) Prior Publication Data

US 2004/0060938 A1    Apr. 1, 2004

Related U.S. Application Data

(63) Continuation-in-part of application No. PCT/EP02/02763, filed on Mar. 13, 2002.

(30) Foreign Application Priority Data

May 10, 2001    (DE) ................................ 101 22 606

(51) Int. Cl.
- B65D 45/00    (2006.01)
- B65D 45/28    (2006.01)
- B65D 51/18    (2006.01)
- B65D 53/00    (2006.01)

(52) U.S. Cl. ...................... 220/315; 220/255; 220/324; 220/378; 292/256; 292/DIG. 11

(58) Field of Classification Search ................ 220/324, 220/315, 325, 378, 255, 256.1, 260, 669, 220/323; 292/256, DIG. 11
See application file for complete search history.

(56) References Cited

U.S. PATENT DOCUMENTS

| | | | | |
|---|---|---|---|---|
| 2,717,167 A | * | 9/1955 | Worth ......................... | 292/30 |
| 3,626,961 A | * | 12/1971 | Quinones .................... | 137/296 |
| 3,997,078 A | * | 12/1976 | Melton et al. .............. | 220/315 |
| 4,055,274 A | * | 10/1977 | Waldenmeier et al. ... | 220/256.1 |
| 4,260,312 A | * | 4/1981 | Hackney ..................... | 414/292 |
| 4,534,488 A | * | 8/1985 | Boggs et al. ............... | 220/323 |
| 4,580,694 A | * | 4/1986 | Hempelmann et al. .. | 220/256.1 |
| 4,946,209 A | * | 8/1990 | Stauner ...................... | 292/256 |
| 5,975,326 A | * | 11/1999 | Monz ......................... | 220/246 |

FOREIGN PATENT DOCUMENTS

| | | | |
|---|---|---|---|
| DE | 397 845 | | 3/1924 |
| GB | 2 220 647 A | * | 1/1990 |
| WO | WO 97/47014 | | 12/1997 |

* cited by examiner

Primary Examiner—Robin A. Hylton
(74) Attorney, Agent, or Firm—Klaus J. Bach

(57) ABSTRACT

In a cover of a container for a dual cover system, wherein the cover and container have both either a round or a polygonal shape with a seal arranged between the container and the cover and wherein the cover includes at least two clamping closure mechanisms operable by an operating structure arranged in the center of the cover and having operating arms extending to the clamping closure mechanisms for synchronous operation thereof, each clamping closure mechanism includes an outwardly extending elbow lever structure with an upper pivotal support bearing on the cover and a lower pivotal support bearing mounted on a support arm movable up and downwardly by the operating structure.

3 Claims, 1 Drawing Sheet

DUAL COVER SYSTEM WITH CLAMPING CLOSURE MECHANISM

This is a Continuation-in-Part application of international application PCT/EP02/02763 filed Mar. 13, 2002 and claiming the priority of German application 101 22 606.3 filed May 10, 2001.

BACKGROUND OF THE INVENTION

The invention relates to a dual cover system with a clamping closure mechanism for the gas tight closure of a container used particularly for containing radioactive or toxic waste materials, wherein the cover and the container opening have a round or polygonal shape and the cover includes a locking mechanism with clamping devices which are arranged at the circumference of the cover and coupled by the locking mechanism for synchronous operation.

Such so-called dual cover systems are used for closing containers for the containment of radioactive and toxic waste materials. For the transfer of the waste material from a storage containment to such a container, the container is coupled with its cover to the bottom cover of the containment such that the container cover and the containment cover are interconnected in a gas-tight manner to form a so-called double cover. This double cover can be moved as a unit into the containment after the container has been joined to the containment in a gas-tight manner. The waste material can then be transferred from the containment to the container and the transfer opening can again be closed after completion of the waste material transfer to the container. The double covers are then uncoupled and the container can be removed from the containment. During this procedure, only the inner surface areas of the containment and the container covers were exposed to the contaminated waste material, so that, after the uncoupling of the container cover from the containment cover the outer surfaces of the container and its cover are not contaminated.

However for the operation of the dual cover, the closure mechanisms of the two covers have to be coupled and they must be operated from the containment side. For this reason, the cover of the container is provided at its upper side, remote from the container, with a central engagement head for a form-locking reception by a gripping structure on the cover of the containment. For the release and the locking, the engagement head includes a collar stud as a component of the clamping closure mechanism, which is supported so as to be axially movable against the force of a spring. When the collar stud is not pressed inwardly the force of the spring causes a locking of the cover in the container opening by way of the spring force. The cover can be unlocked by pressing the collar stud inwardly against the force of the spring.

DE 34 25 979 C2 discloses a container cover with a central grasping head and a collar stud axially movably supported in the grasping head. The cover is provided with a clamping closure mechanism with several clamping devices which are arranged at the container side of the cover distributed over the cover circumference and are coupled by way of the clamping closure mechanism so that they are actuated to move outwardly in a synchronous manner. For the release, the collar stud is pressed into the grasping head, which engages a rigid support arm carrier, that extends parallel to the cover on the container side thereof. At the ends of the support arms, levers are pivotally supported so that they can be pivoted outwardly. The levers extend through openings in the cover and are concurrently moved outwardly by the relative movement of the support arm carrier and the cover when the collar stud is released or they are retracted when the collar stud is pushed inwardly. For the form fitting reception of the levers, the container includes a circumferential groove. During the locking and release movements however forces are generated which, in the area of the clamping structures, result in increased friction and therefore in relatively high force requirements for the operation of the double cover system.

It is the object of the present invention to provide a cover of a container as a component of a dual cover system, which is provided with a optimized clamping arrangement with low friction forces. The operating arrangement for the optimized clamping system also should be easy to manufacture accurately and provide for highly reliable sealing of the closed container.

SUMMARY OF THE INVENTION

In a cover of a container for a dual cover system, wherein the cover and container both have a round or polygonal shape with a seal arranged between the container and the cover and wherein the cover includes at least two clamping closure mechanisms operable by an operating structure arranged in the center of the cover and having operating arms extending to the clamping closure mechanisms for synchronous operation thereof, each clamping closure mechanism includes an outwardly extending elbow lever structure with an upper pivotal support bearing on the cover and a lower pivotal support bearing mounted on a support arm movable up and downwardly by the operating structure.

The invention will be described below in greater detail on the basis of the accompanying drawings.

DESCRIPTION OF A PREFERRED EMBODIMENT

Figure 1:
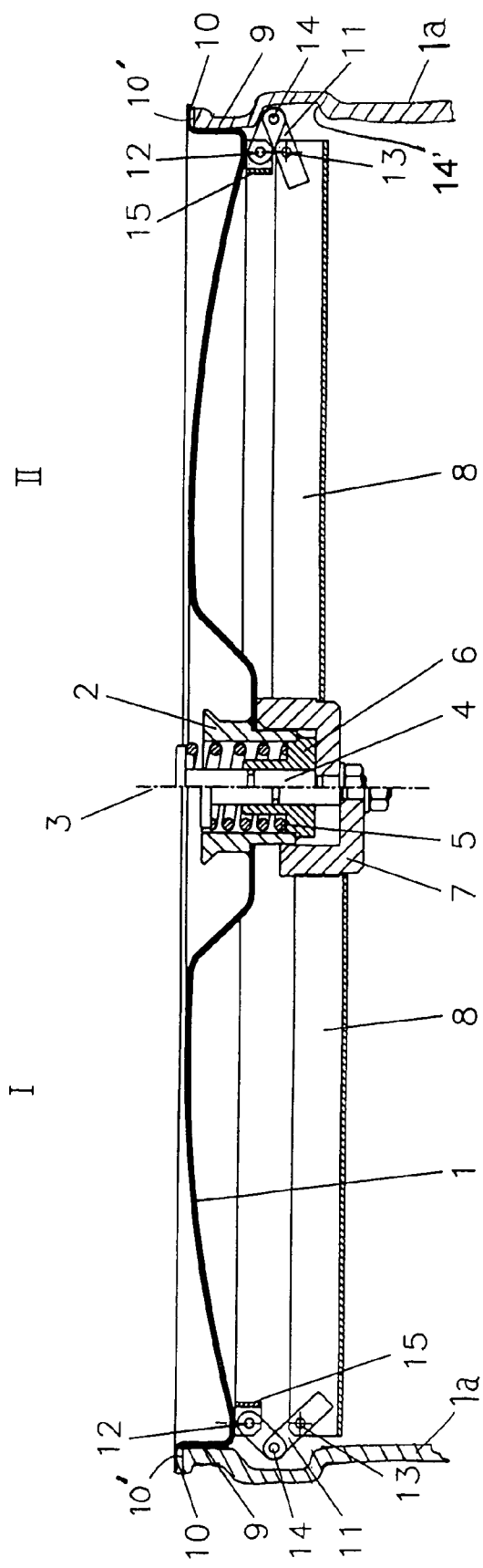
FIG. 1 is a cross-sectional view of a dual cover with a clamping closure mechanism according to the invention.

The FIGURE shows in a cross-sectional view a cover 1 for a container 1a, which is not shown in detail. Also, the containment-side components such as a grasping device for the engagement head 2 are not shown. The cover 1 is shown at the left of the axial symmetry line 3 (side I) in a released state (but not fully released) and at the right of the axial symmetry line 3 in a locked state (side II). Further components of the cover are the clamping closure mechanism comprising a collar stud 4, a compression spring 5, a spring guide member 6, a sleeve structure 7, operating arms 8 consisting of U-profile members 8 and clamping devices (11, 13, 14).

The cover 1 is provided at its circumference with a cylindrical or truncated cone-like circumferential guide surface 9 and a circumferential planar seal surface 10, which is adopted in design on the opening of the container which is to be closed but which is not shown in the drawing. The opening of a container for radioactive or toxic waste materials is generally planar. It is also generally of round or polygonal shape. Between the seal surface 10 of the cover 1 and the container opening to be closed, there is a seal of limited resiliency preferably a rubber or plastic seal with or without cavities is provided by way of which the cover is supported on the container 1a.

The U-profile members 8 extending radially outwardly from the sleeve structure 7 are rigidly connected to the sleeve structure 7 preferably by bolt or weld connections. Together they form the support arm carrier. By way of the sleeve 7, the support arm carrier 7, 8 is connected in a suitable manner, preferably by a bolt connection with the collar stud 4 and is guided thereby by the spring guide member 6. The spring guide member 6, which is firmly connected to the engagement head 2 which again is connected to the cover 1 also supports and guides the compression spring 5 and transmits the force of the compression spring 5 to the sleeve structure 7. In this way, the U-profiles 8 of the support arm carrier remain in any possible position parallel to the plane defined by the seal surface 10.

A novel feature of the cover is the design of the clamping structure arranged at the circumference of the cover. Each of the clamping devices comprises a radially outwardly projecting elbow lever structure 11, which is connected between an upper support bearing 12 on the cover and a lower support bearing 13 on the support arm structure 7, 8, which is disposed in a plane extending parallel to the cover plane and by which the elbow lever structure 11 can be actuated. The upper support bearing 12 is preferably in the form of a support block 15, which is firmly welded to the underside of the cover 1, and which includes a pivot pin connection. The lower support bearing 13 is provided at the ends of the U-profile members 8 and also includes a pivot pin joint. The elbow lever arrangement is so designed that, by raising the support arm carrier with the support bearings 13 in the direction toward the cover (which occurs by the forces of the compression spring for locking) the elbow 14 pivots about the pin connection of the support bearing 12 and is moved thereby outwardly and upwardly toward the seal surface 10. In the process, the elbow first moves into the groove 14' in the container wall just below the container opening in a form fitting manner and, with increasing upward movement of the support arm structure, engages the seal surface 10 of the cover with the rim of the container.

The clamping structures are generally arranged evenly spaced so as to act radially outwardly at the circumference of the cover so that the cover is pressed uniformly onto the container rim over the whole seal surface area of the opening. If the container opening and the cover are polygonal, it is advantageous to provide a clamping structure in the center area between adjacent corners.

However, if a polygonal cover has less than six corners, the corner areas may yield so that reliable sealing may not be achieved in these areas. In this case, more than one clamping structure may be provided along the sides between the corners which should then be arranged nearer to the corners. Then they would not be arranged at uniform distances along the cover circumference and not extend radially but normal to the sides of the polygon in order to achieve sufficient engagement forces in the corner areas of the cover. Alternatively, a clamping structure may be provided in the center area between adjacent corners which acts outwardly normal to the respective side of the cover and at least one other clamping structure may then be arranged near each corner which provides for appropriate engagement of the seal surfaces in the corner areas. The support arm carrier must then be designed to support all the clamping structures for example, by branching the U-profile arms and/or curving the profile arms or branches. Furthermore, an arrangement may be provided wherein the clamping structures extend radially outwardly directly into the corners wherein the container must be provided in the corresponding recesses or grooves below the container rim only in the corner areas. The container may also be provided with an engagement ring for form-locking engagement of the clamping structure.

In the arrangement according to the invention, there is, in contrast to the prior art arrangements, no sliding friction when the cover is engaged with the container (the friction forces become very large as the cover is pulled into engagement with the container rim) by the clamping structure, but friction is generated only in the joints which can be held to a minimum by suitable bearing structures such as non-friction bearings.

The kinematic advantages of a locking structure with elbow lever mechanisms can further be enhanced by providing between the seal surfaces 10 of the cover 1 and the container to be closed, an elastically resilient gasket, preferably a rubber or plastic material gasket, which is disposed on the container rim on which the cover is supported.

The elbow lever engagement mechanism according to the invention can also easily accommodate manufacturing tolerances particularly with respect to the distance between the recess engagement surface of the container and the rim of the container because of the increasing pivoting movement of the elbow 14 in the direction of the seal surface 10. As a result, manufacturing tolerances are acceptable in the manufacture of the clamping structure since tolerances can be better accommodated by the elbow lever engagement mechanism. Furthermore, the components of an elbow clamping structure can be accurately dimensioned and can easily be manufactured with high accuracy.

What is claimed is:

1. A cover with a container (1a) of a dual cover system for the gastight closure of the container (1a) for containing radioactive or toxic waste materials, the container cover (1) and the container (1a) being adapted in their design to each other and having a round or polygonal shape with a seal surface (10) arranged on said container cover (1) and a seal (10') between said container (1a) and said container cover (1), said container cover (1) including at least two clamping closure mechanisms (11–14) distributed around the circumference of said container cover (1), a clamping closure mechanism operating structure (2–7) arranged in the center of said container cover (1) and being coupled to said clamping closure mechanisms (11–14) for synchronous operation thereof, said container (1a) having recesses (14') for form-locking engagement of said clamping closure mechanisms (11–14), said clamping closure mechanism operating structure (2–7) including a central grasping head (2) for engagement by an operating structure of a cover of a dual cover system, and including a collar stud (4) which axially movably supported in said central grasping head (2), a spring (5) engaging said collar stud (4) for actuating said clamping closure mechanisms (11–14), operating arms (8) extending from said clamping closure mechanism operating structure (2–7) to said clamping closure mechanisms (11–14), each clamping closure mechanism (11–14) comprising an outwardly extending elbow lever structure with an upper elbow lever pivotally supported by an upper pivotal support bearing (12) on said container cover (1) and a lower elbow lever (11) pivotally mounted on the operating arm (8) and pivotally connected to said upper elbow lever to form an elbow (14), said operating arm (8) being connected to said collar stud (4) for operating said clamping closure mechanism (11–14), such that, upon upward movement of said collar stud (4) and said operating arms (8) by said spring (5), the elbow (14) is pivoted outwardly and upwardly into said recess (14') for engagement therein with the container wall 1a.

2. A cover with a container according to claim 1, wherein said seal surface (10) is provided with one of a rubber and plastic material (10') disposed on one of the container rim and the container seal surface (10) and forming the seal (10).

3. A cover with a container according to claim 1, wherein each recess (14') consists of one of a groove, a stepped portion and an indentation provided in said container wall (1a).

* * * * *